Figure 1:
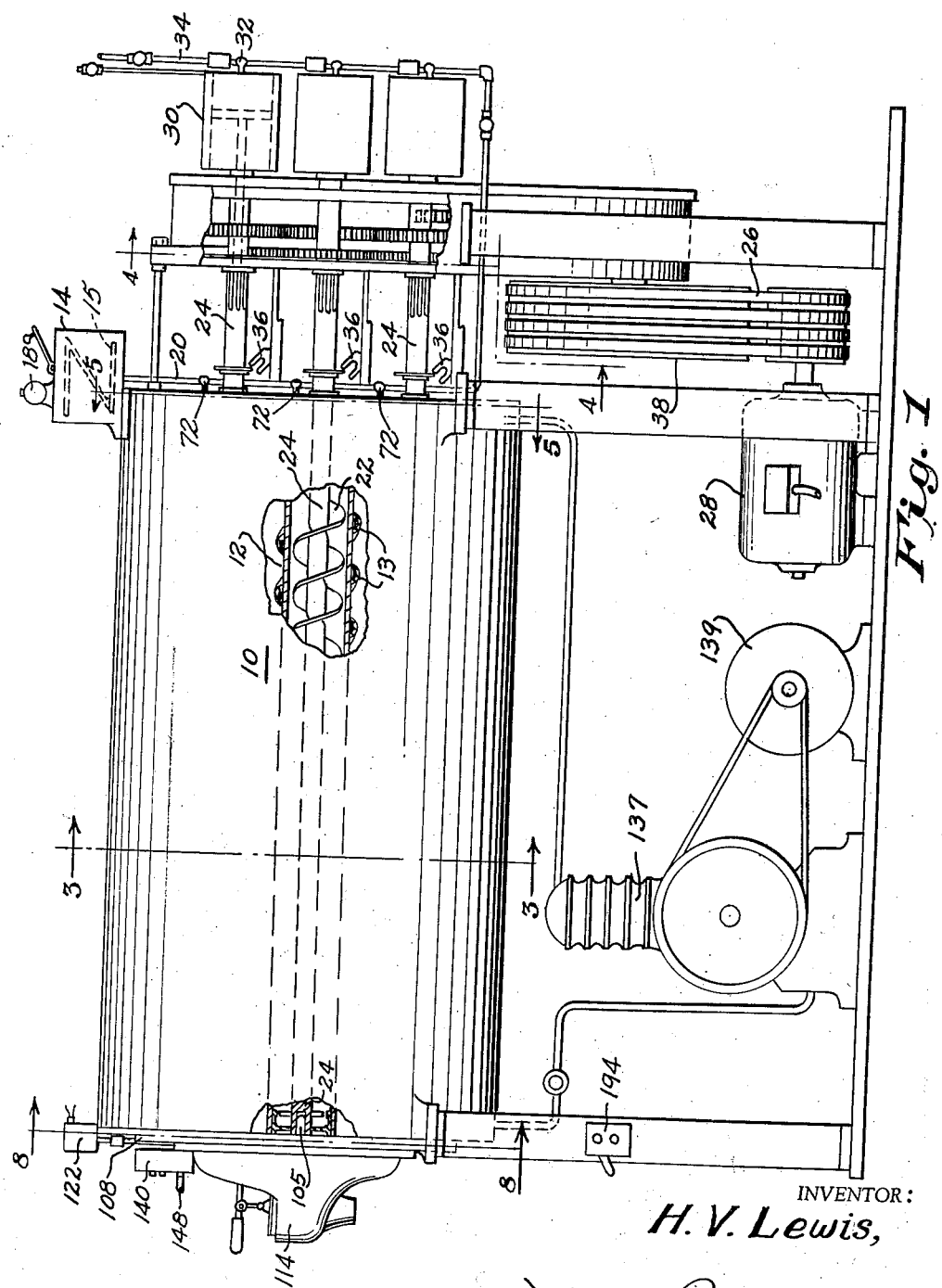

Oct. 23, 1956 — H. V. LEWIS — 2,767,553
AUTOMATIC MACHINE FOR PREPARING AND SERVING MULTIFLAVORED REFRIGERATED MIXTURES
Filed April 23, 1953 — 10 Sheets-Sheet 1

INVENTOR:
H. V. Lewis,
BY Homer R. Montague
ATTORNEY

INVENTOR:
H. V. Lewis,
BY Homer R. Montague
ATTORNEY

Oct. 23, 1956

H. V. LEWIS 2,767,553

AUTOMATIC MACHINE FOR PREPARING AND SERVING
MULTIFLAVORED REFRIGERATED MIXTURES

Filed April 23, 1953

10 Sheets-Sheet 4

INVENTOR:
H. V. Lewis,
BY Homer R. Montague
ATTORNEY

Oct. 23, 1956

H. V. LEWIS 2,767,553

AUTOMATIC MACHINE FOR PREPARING AND SERVING
MULTIFLAVORED REFRIGERATED MIXTURES

Filed April 23, 1953

10 Sheets-Sheet 5

INVENTOR:

H. V. Lewis,

BY Homer R. Montague

ATTORNEY

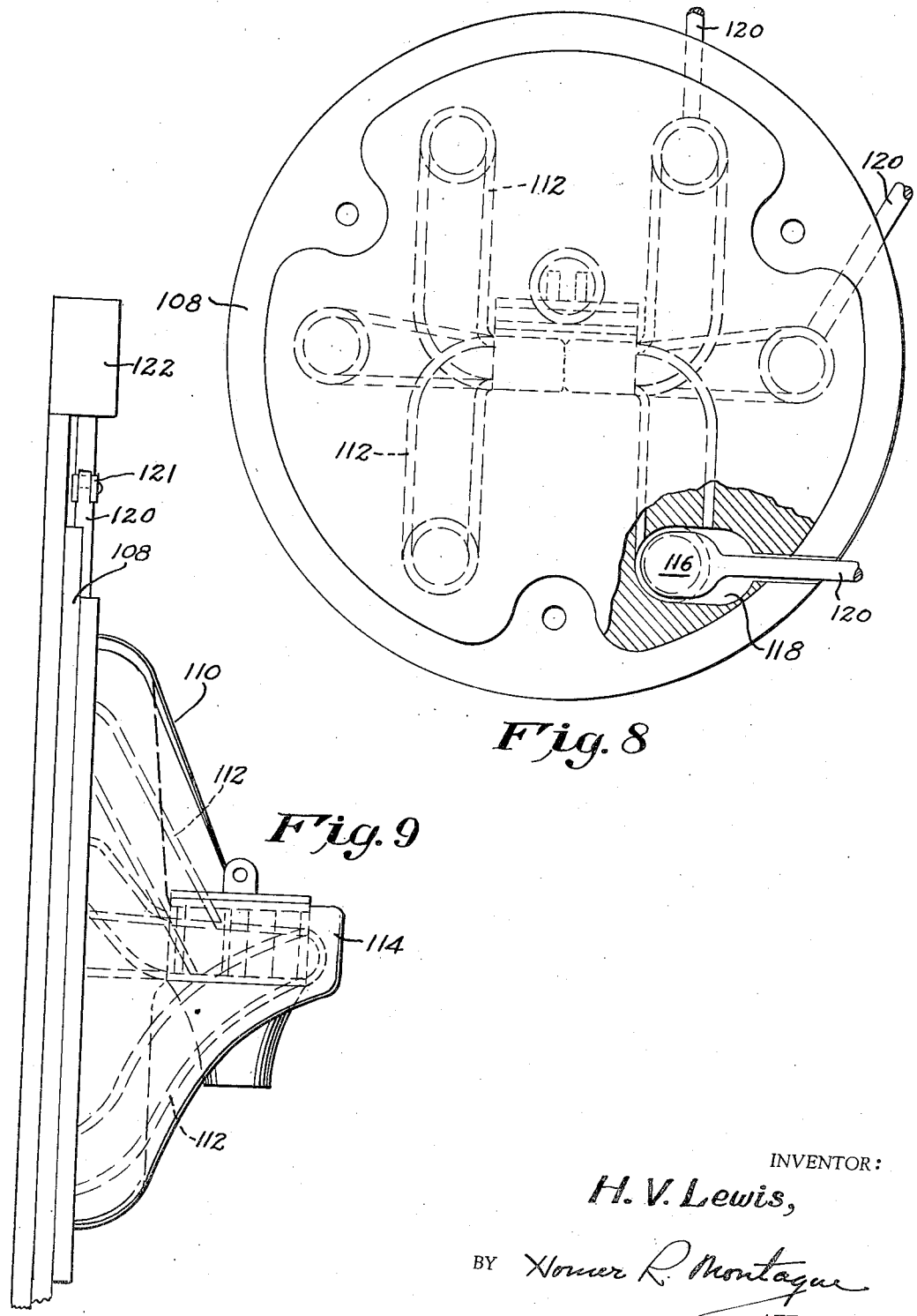

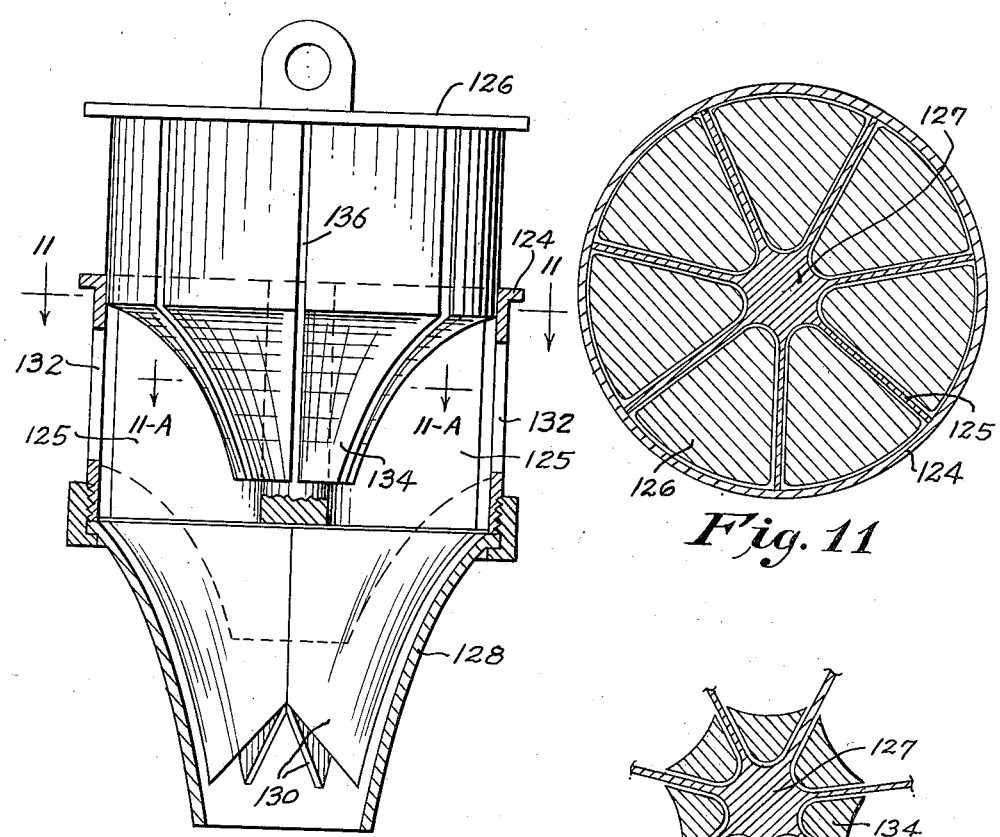

Oct. 23, 1956

H. V. LEWIS 2,767,553

AUTOMATIC MACHINE FOR PREPARING AND SERVING
MULTIFLAVORED REFRIGERATED MIXTURES

Filed April 23, 1953

10 Sheets-Sheet 8

INVENTOR:
H. V. Lewis,

BY Homer R. Montague

ATTORNEY

United States Patent Office 2,767,553
Patented Oct. 23, 1956

2,767,553

AUTOMATIC MACHINE FOR PREPARING AND SERVING MULTIFLAVORED REFRIGERATED MIXTURES

Henry V. Lewis, Decatur, Ill.

Application April 23, 1953, Serial No. 350,736

12 Claims. (Cl. 62—2)

This invention pertains to machinery for the production and dispensing of refrigerated mixtures of an edible nature, such as so-called "frozen" custards, creams and the like, either for immediate consumption or for subsequent hardening in storage.

It is a principal object of the invention to provide an apparatus of the above type which is largely automatic in operation, and which can be used to produce and dispense edible products of the kind indicated in any selected combination of flavors or colors within the capacity of the machine.

A further object of the invention is to provide such a machine in which the selected combination of mixes, differing from one another in flavor and/or color, is dispensed directly into a suitable container in such a way as to retain a predetermined pattern or arrangement of the different mixes, to provide an attractive appearance in the end product.

An additional object of the invention is to provide a machine of the above type whose parts are relatively simple and so arranged as to be readily dismantled by units in order to facilitate cleaning and sterilizing operations, and thereby to provide a high degree of sanitation.

Still another object of the invention is a machine of this type which receives aerated mixtures of creams or the like from refrigerated storage chambers or reservoirs, maintains suitable stand-by quantities of each in condition for final dispensing, and automatically replenishes these stand by quantities as they are selected and dispensed for the composition of chosen combinations of such materials. The machine also provides for push-button selection of the desired combination of materials, to provide a product which may be all of one flavor or color, or may consist of any desired selection of such materials up to the capacity of the reservoirs provided for the machine under discussion.

The machine of my invention also provides for ready substitution of various outlets for the final product, to permit changing the pattern of the materials extruded into the final dispensing container.

Still another object of my invention is to provide, in a machine of the general type indicated above, arrangements which tend to eliminate heat loss, so that by suitable insulation, a refrigerating unit of modest capacity will suffice for operation of the apparatus, with consequent savings in operating expense.

In general, the above and other objects and advantages of my invention are accomplished by providing a plurality of storage chambers or reservoirs which are suitably insulated and refrigerated, and each of which contains a liquid mixture suitable for the production of iced or congealed cream. Means are provided for continuously agitating or mixing the liquid materials in these chambers. Conduits or tubes lead from the respective chambers to a set of secondary mixing and congealing chambers, one for each reservoir chamber, and electrical or comparable control valves serve to admit the liquid material to such of the secondary chambers as have been depleted by the dispensing of a serving of the final product. Air under pressure is used to induct the liquids, in the fashion of a Venturi injector, whereby to assure proper flow, as well as to atomize and break up the material, and to increase the air content of the final product for optimum flavor and texture.

In the secondary chambers, the final congelation of the materials is accomplished, and since automatic replenishment is achieved as above described, it follows that each of the secondary chambers is always more or less filled with the aerated and refrigerated mixture corresponding thereto. In each secondary chamber a novel combined mixing and conveying element, in the form of a helical impeller, is continuously rotated to mix and remix the contents.

At the discharge end of the assembly of secondary chambers, a head is provided, together with electrically controlled gate valves for selecting (as by push-button control) the desired combination of flavors. A manual or pedal-controlled valve permits regulation of the total quantity of material discharged at each serving, and means are provided for automatically recirculating or forcing back into the secondary chambers any material in excess of that desired to be discharged. Simple means are also provided to select as between "idling" operations (in which the machine is ready for instant dispensing of the product) and the actual dispensing operation itself, as well as to permit instant return of all flavor-selecting push-buttons to their inactive positions in readiness for a subsequent different selection.

Figure 2:
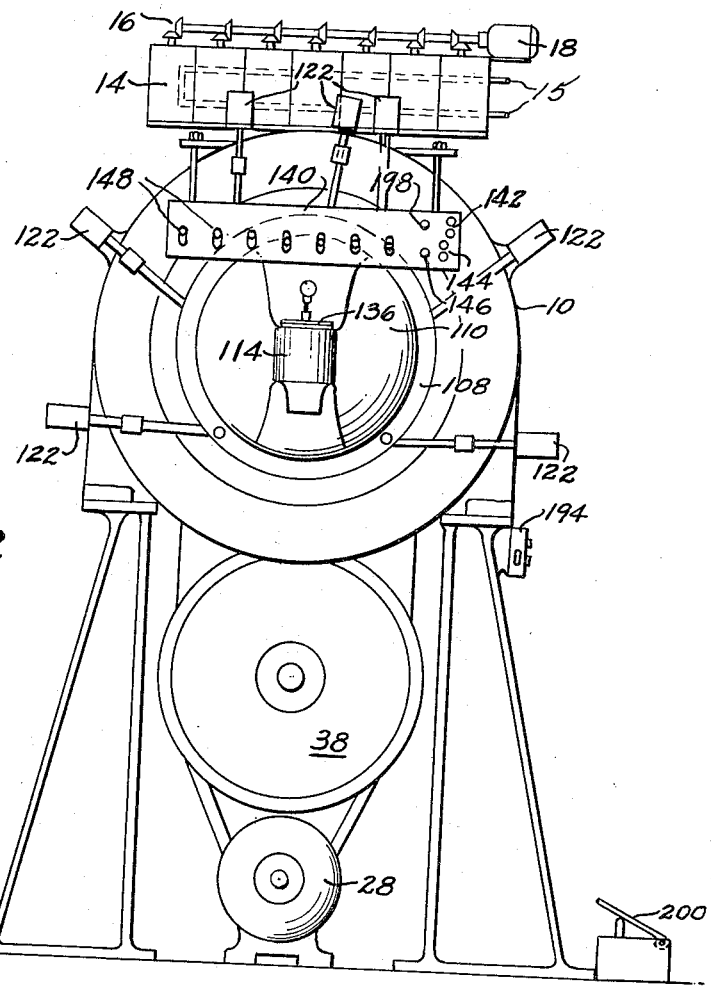
Figure 3:
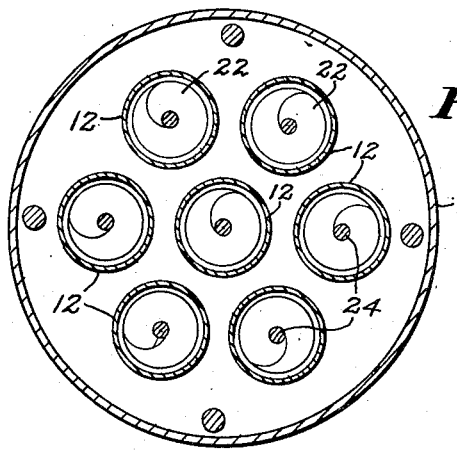
Figure 4:
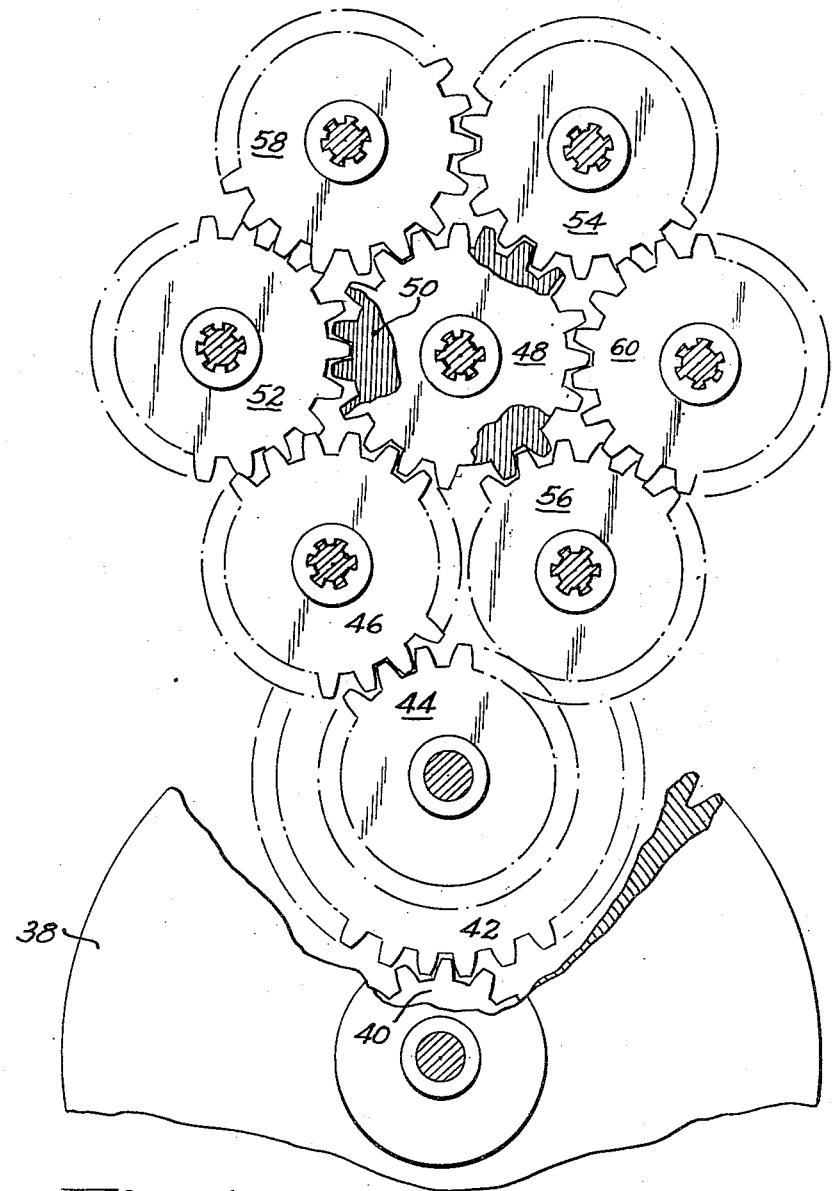
Figure 5:
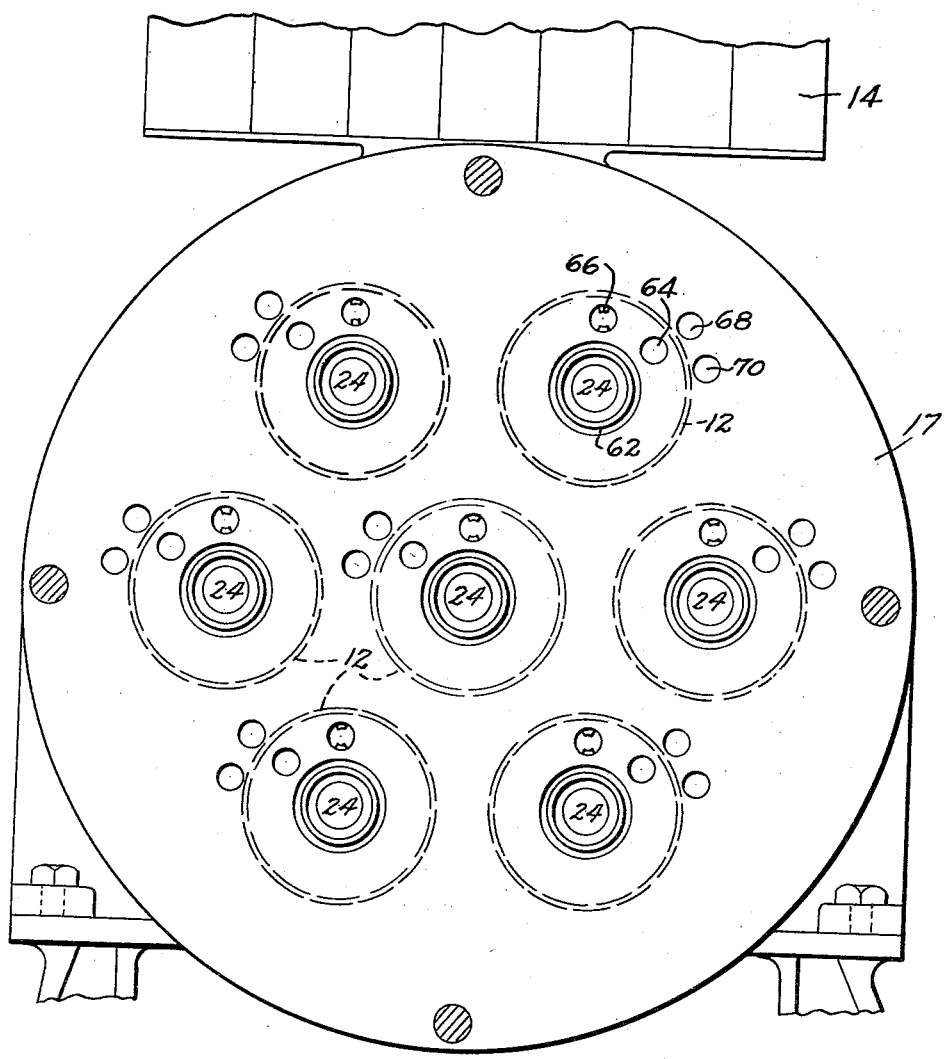
Figure 6:
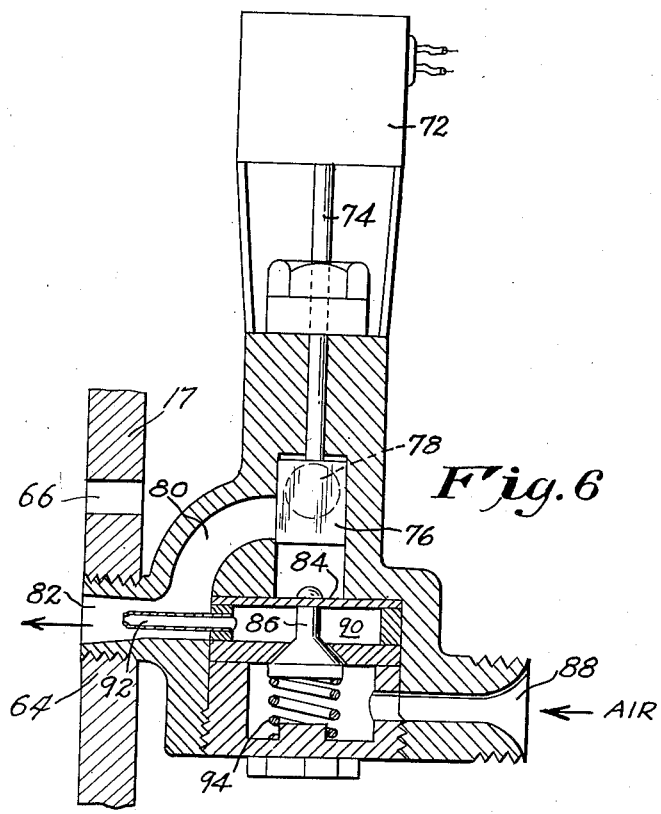
Figure 7:
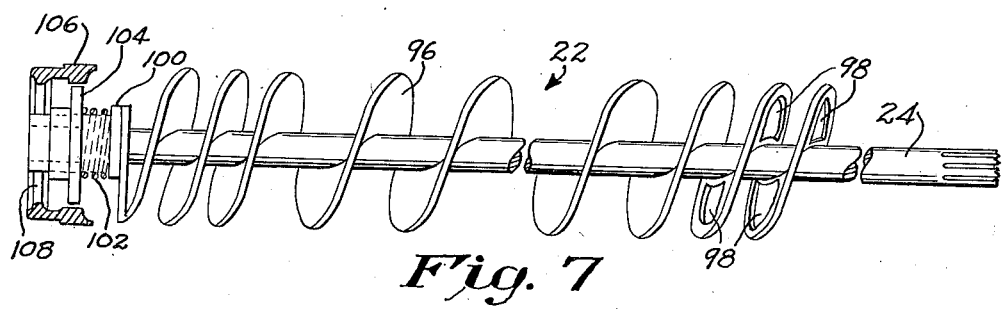

With the above general description in mind, the invention itself, and the preferred manner of practising the same, will best be understood by referring to the following detailed specification of a preferred embodiment thereof, given by way of example and not for purposes of limitation, and taken in connection with the appended drawings, forming a part hereof. In the drawings, Fig. 1 is a side elevation of the complete device, illustrating the general arrangement of parts, Fig. 2 is a front elevation of the same, Fig. 3 is a cross-sectional view taken on line 3—3 of Fig. 1, Fig. 4 is a sectional view to a larger scale, taken on line 4—4 of Fig. 1 and illustrating the arrangement of driving gears for the multiple impellers, Fig. 5 is an enlarged vertical sectional view taken on line 5—5 of Fig. 1, Fig. 6 is an enlarged vertical view of one of the pneumatic injectors for supplying liquid mix to the congealing chambers, Fig. 7 is a fragmentary side elevation, illustrating the construction of one of the mixing and impeller units and parts cooperating therewith, Fig. 8 is a sectional view taken on line 8—8 of Fig. 1 and illustrating the arrangement of the passages or conduits by which the congealed mixtures are delivered to the dispensing nozzle, Fig. 9 is a side elevation of the same structure, Fig. 10 is a view in vertical section illustrating the construction of the dispensing nozzle.

Figure 13:
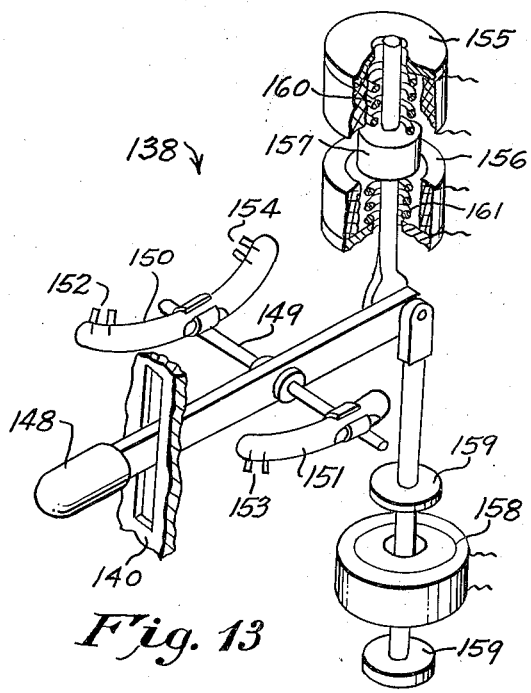
Figure 14:
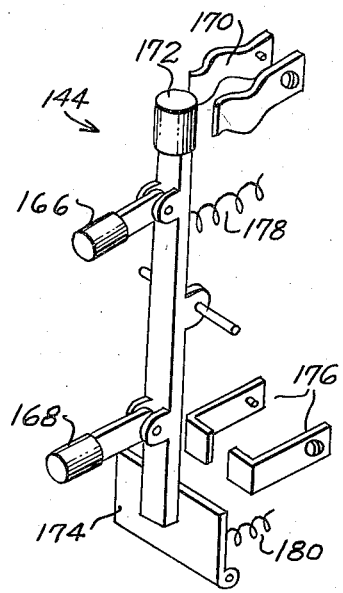
Figure 15:
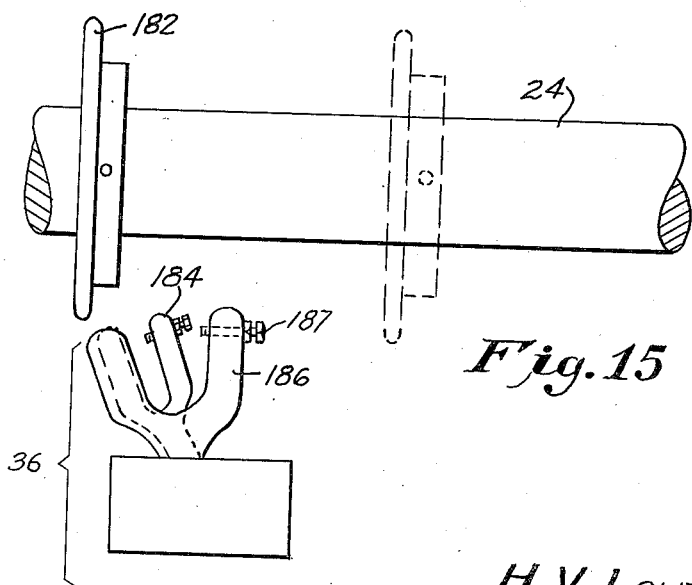
Figure 16:
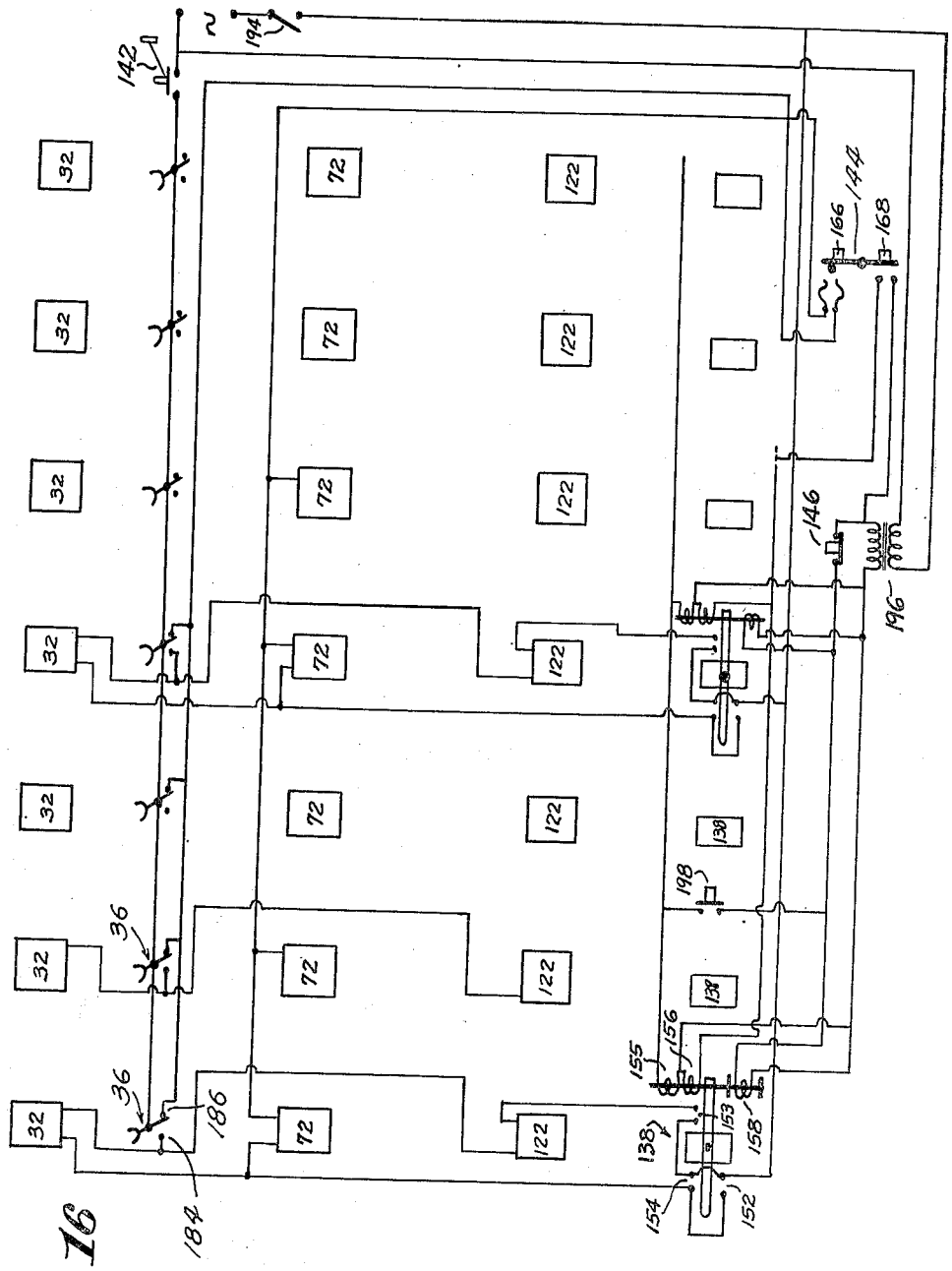
Figure 17:
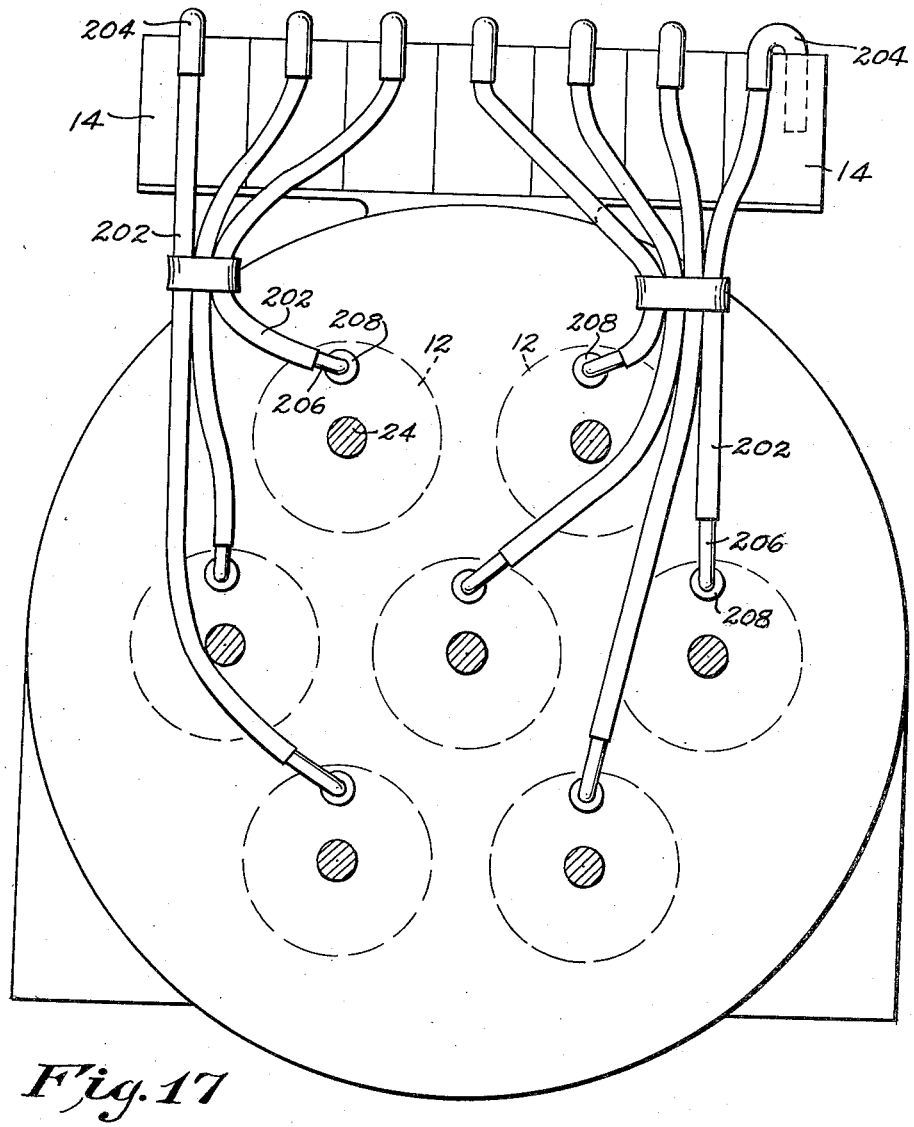

Fig. 11 is a sectional view taken on line 11—11 of Fig. 10,

Fig. 11–A is a similar view taken on line 11A—11A,

Fig. 12 is a perspective view of one of the components of Fig. 8, forming a part of the nozzle unit, Fig. 13 is a perspective view of one of the switches and magnetic control devices for selecting a desired flavor, Fig. 14 is a similar view of another push-button control for the machine, Fig. 15 is a fragmentary view in side elevation of a switch-operating device on an impeller, Fig. 16 is a schematic wiring diagram of the control portions of the machine, and Fig. 17 is a view showing a sterilizing attachment for the machine.

The general arrangement and operation of the machine illustrated will first be described in connection with Figs. 1 to 3 of the drawings, to which reference is now made. In Fig. 1, the apparatus comprises a main cylindrical body portion or housing 10, disposed upon suitable supports at a convenient height and with its axis horizontal. Within this housing 10, and as more clearly seen in the sectional view of Fig. 3, there are arranged a plurality, herein seven, of individual refrigerated cylinders, designated by numeral 12 (since all are substantially identical), with their horizontal axes disposed parallel to one another. These individual cylinders constitute the final or secondary cooling chambers of the machine, as will appear. The refrigeration of the individual cylinders is accomplished by circulating refrigerant about them, as by coils 13 secured to their outer walls as in Fig. 1. The coils may be flattened and welded to the cylinders for good thermal contact. The main housing 10 is suitably insulated to prevent excessive heat leakage into the individual cylinders.

The open ends of the individual cylinders 12 are secured in suitable end sheets or plates of the main housing 10, as will be described in more detail hereinafter. At the rear of the machine, or at the right end as seen in Fig. 1, and surmounting the main housing 10, are a plurality of insulated primary cooling chambers or reservoirs 14, within which are maintained the mixtures of cream, flavoring or the like which are to be congelated and dispensed. Each reservoir 14 is provided with cooling means such as a cooling coil 15 (Fig. 1), and with an agitator or the like driven continuously as by gearing 16 and a motor 18 (Fig. 2), and from these reservoirs the necessary amounts of mixture, pre-cooled, are led to the individual secondary mixing and congelating chambers 12, as by tubes indicated at 20 in Fig. 1. The controls for the delivery of mixture to chambers 12 will be described below.

Within each of the secondary chambers 12 there is disposed a combined mixing, agitating, scraping, compressing and conveying device comprising a helical blade 22, shown in detail in Fig. 7 and described below, which causes the mixture admitted to such chamber to be propelled toward the front end of the machine, or to be continuously remixed and agitated when none of the product is being withdrawn. These helical devices will be referred to hereinafter as "impellers," merely for brevity of description. Each impeller 22 is carried by a shaft 24 which extends through a suitable seal in the rear wall of housing 10 (see Fig. 1) and is splined or keyed so as to be driven by a respective drive gear of a series of such gears, all driven as by belts 26 from a motor 28. The splined connection between shafts and gears also permits the shafts 24, and hence the impellers 22, to be reciprocated by suitable power elements, here shown by way of example as pneumatic cylinders and pistons designated generally by numeral 30 and mounted rearward of the housing 10. The reciprocation of the impellers is controlled by solenoid operated two-way valves 32 in the respective air lines 34 feeding the pneumatic cylinders, controlled by electric switches 36 arranged to be operated during reciprocation of the shafts 24, as will be described in connection with the control cycle of the apparatus. The two-way valves, when de-energized, open the cylinders 30 to atmosphere via a restricted bleeder orifice for return-speed control, and the return of the impellers and their pistons results from the reaction of the helical impellers against the contents of the secondary cylinders 12. Obviously, other power means for reciprocating the shafts could readily be employed.

The arrangement of driving gears will best be understood by referring to Fig. 4, which shows in detail the pulley 38 (driven by the motor 28) on a shaft with a gear 40 driving a pair of spaced gears 42 and 44 fixed on a common shaft. Gear 44 meshes with one of the splined gears 46, which in turn drives a pair of gears 48 and 50 splined one behind the other on the shaft of the central one of the array of seven impeller shafts. Splined gears 52, 54 and 56 mesh with the rearmost central gear 50, while splined gears 58 and 60 mesh with the forward gear 48. Since some of the gears rotate oppositely to others, the impellers of the corresponding mixing cylinders 12 will be reversed in pitch, so as to produce the desired forward movement of the cylinder contents.

Fig. 5 of the drawings shows the appearance of the rear wall or tube plate 17 of the main housing 10, with the seven openings through which pass shafts 24, surrounded by seal-ring annular recesses 62. Inlet openings for the precooled mixtures from the reservoirs 14 are indicated at 64, and vent openings at 66. Associated with each of the secondary cylinders 12 is also an opening 68 to receive a thermometer bulb for temperature indication, and an opening 70 to accommodate an individual thermostatic expansion-valve control bulb for coils 13.

In order to control the amount of mixture admitted to each of the congelating chambers 12, as well as to aerate, break up and improve the texture of the product, the inlets 64 are connected to respective solenoid-operated combined valves and air injectors, one of which is shown in detail in Fig. 6. This device has the operating solenoid 72 operating a stem 74 extending into the body of the device and terminating in a gate valve element 76 covering the inlet opening 78 leading to the corresponding reservoir 14. When the solenoid is energized, stem 74 moves down and uncovers the inlet, allowing mixture to flow by gravity through channel 80 and hence to the outlet 82 to the secondary cylinder. Also, downward movement of stem 74 depresses a diaphragm 84 to open an air valve 86 and admit air from air inlet 88 to a chamber 90, whence it flows to an injector nozzle 92, mixing with and aerating the liquid mixture, and drawing it forcibly into the cooling chamber by Venturi action. A spring 94 restores valve 86 to closed condition when solenoid 72 is de-energized, and of course the inlet opening 78 is closed at the same time. Admission of mixture to the secondary (congelating) chambers, when it occurs, commences at the end of the forward stroke of the impeller, and continues during a part of the return stroke.

The construction of the impeller units themselves, one being provided in each cylinder 12, is detailed in Fig. 7, which shows the shaft 24 carrying the helical blade 96 which extends nearly the entire length of the secondary cylinder, less the distance of reciprocation of the shaft. At each end of the helical formation 96, the pitch of the helix is reduced; thus, the impeller may comprise several turns having a pitch of for example about 2 inches, separated by several central turns having a pitch of about twice that amount. At the inlet end (on the right in Fig. 7) one or more turns of the helical member are provided with apertures 98 to aid the entering mixture to be more thoroughly agitated and applied to the cooled walls of the cylinder. At its forward or left end, the helix terminates in a combined scraper and pressure relief valve comprising a disc 100 fixed to shaft 24 and supporting a spiral spring 102 bearing against a disc 104 loose on the shaft and which can move rearwardly against the spring force. This disc 104 normally substantially closes an opening in an annular scraper collar 106 secured to shaft 24 by spokes or a spider element 108. Thus, as shaft 24 moves forward, it will tend to drive material out of the cooling cylinder 12 in the manner of a piston, and thence to the outlet of the machine. However, when none of the product is being drawn from a cylinder, the pressure built up upon the congelated material will ultimately cause disc 104 to move rearwardly against the force of spring 102, and the material can flow rearwardly in recirculating fashion. Thus, the shaft can be reciprocated (and rotated) continuously without injury to the parts. The impeller 22 is, of course, not a precise fit in its cylinder 12. The forward end of each shaft (as shown in Fig. 1) may be carried upon a bearing stud 105 extending from the machine front plate into a bored opening in each shaft end.

At the forward or discharge end of the apparatus, and as best shown in Figs. 1, 8 and 9, there is also an end plate for the main cylinder housing 10, designated by numeral 108, preferably formed in two overlying pieces and suitably bored to receive the ends of the cooling cylinders 12 in the manner of a boiler tube sheet. A thermally insulated manifold structure 110 is connected to this end plate, and defines channels 112 which convey the congealed mixture to the manually or foot-operated discharge valve 114. To accomplish selection of the one or more flavors or colors of mixture to be dispensed, the cylinder exits are provided with individual solenoid operated gates or valves, which are slidably arranged in suitable grooves or recesses formed on the facing surfaces of the two parts of end plate 108. This construction is best seen in Fig. 8, in which a part of one of the pieces is broken away to show the gate valve 116 for one cylinder outlet, received in a groove 118 and controlled from outside the end plate by a rod 120 connected by a knuckle 121 to the armature of a corresponding solenoid, the set of seven such solenoids being shown in Fig. 2 and designated by said number 122. Operation of any one or more of the solenoids, after the machine has been initially charged, will permit the corresponding mixtures to enter the manifold and the manual discharge valve, for dispensing under manual or foot pedal control.

The outlet valve 114 itself is detailed in Figs. 10 to 12 of the drawings, in which will be seen the main cylindrical shell 124 slidably receiving the plug 126. Shell 124 contains a removable assembly of radially arranged fins, herein seven in number, designated 125, and plug 126 is radially slotted as at 136 to slide over these fins. As shown in Fig. 11, where these fins converge at the center, they merge into a central core, somewhat star-shaped, indicated by numeral 127. Plug 126 (Fig. 12) thus fits over the core and its fins. Removably secured to the shell 124 is the nozzle or shaping outlet 128, tapered downwardly and also provided internally with a removable cellular assembly of radiating fins 130, to define seven sector-shaped apertures. The conduits such as 112 of the manifold 110 (Fig. 8) terminate at orifices 132 of shell 124, and when the plug or core 126 is raised (as shown in full lines in Fig. 10), the mixture from the conduits is forced into the shell 124 and thence to the passages in the nozzle 128, being given any desired cross-sectional shape (herein, pie shaped) before emerging. To aid in the flow of the congealed material through the outlet, the under side of plug 126 is defined by concave curved surfaces 134 as shown in Fig. 12, which receive the flow from the orifices 132 and direct it downwardly in the respective apertures of the nozzle. The presence of fins 130 does not prevent complete closure of the valve by plug 126, because the slots 136 receive the fins 130 when the valve is completely closed; the closed position of the plug is shown by broken lines in Fig. 10.

Suitable air compressing means and refrigerating units, shown schematically at 137 in Fig. 1, may be independently powered as by motor 139 or driven by the same motor 28 which rotates the impeller shafts.

The control apparatus and the manner in which automatic operation is achieved, as well as the arrangement for selection of flavors, will now be described, in connection with Figs. 13 to 16. The rotation of the impellers is continuous, once the machine has been put in service, and during the period when the machine is being prepared for use, the admission of pre-cooled mixtures to the respectively secondary cylinders is continued until said cylinders are reasonably charged and ready for dispensing. At that time, however, controls are operated to put the machine into an "idling" state, in which mixing continues, but no additional charges of mixture are admitted to the cylinders. Thereafter, when a serving of one or more flavors is to be accomplished, the proper flavor-selecting push-buttons are operated, and the machine dispenses the desired amount thereof, while the cylinders selected are automatically replenished from the pre-cooling chambers 14. Also, since different amounts may be dispensed per serving, it is necessary that the selected push-buttons be held in operated condition, once depressed, until released by a further control. The precise amount of material dispensed, of course, is regulated by the operator by the manual control outlet valve 114.

When there is sufficient congealed material in the secondary chambers and a small serving is withdrawn, the impeller may not travel to the extreme forward position, at least not far enough to operate the toggle switch control 36 at one set of its contacts (as more fully described below) to admit more mixture, or to operate to shut off the air supply to the corresponding pneumatic actuator; however, whenever the master switch to be described, and the corresponding foot pedal switch is opened, the current supply to the solenoids 32 controlling the air inlet to the actuators is interrupted, thus to permit return of the impeller at a speed determined by a bleeder orifice in the solenoid valve 32 controlling the air supply to the actuator. The return motion results from reaction of the congealed contents of the chamber against the rotating helical impeller. For best operation, each secondary compartment should at no time have more than six to eight inches of congealed material in its forward end, and practically nothing in its rear end.

Fig. 13 of the drawings shows, in perspective view, a preferred form of toggle switch control for flavor selection, generally indicated by numeral 138. A plurality of these switches are mounted upon a suitable control panel 140 (Figs. 1 and 2) for ready removal as a group to enable the machine to be reached and partly dis-assembled for cleaning and the like. The control panel (Fig. 2) will also carry a master switch 142, an idling switch 144, a magnetic clearance push-button 146 and a serve-all button 198, the latter enabling the operator to choose the entire group of flavors without having to operate the individual flavor-selecting toggles. In Fig. 13, the operating handle 148 is pivoted on a shaft 149 which carries two mercury switch elements 150 and 151, of tubular or other known form, so disposed that when the toggle handle is in its central position (as illustrated) no circuit is completed. When the shaft 151 rotates counter-clockwise (handle 148 down) two sets of contacts 152 and 153 are closed, when the shaft rotates in the other direction, only a single set of contacts 154 is closed. To permit electromagnetic operation of the switch, a pair of spaced-apart operating coils or solenoids 155 and 156 are disposed to cooperate with a magnetic slug 157 carried by a shaft linked to the end of the lever carrying handle 148, spiral springs 160, 161 in the coils or elsewhere maintaining the slug centered between the coils until one or the other is energized, when the slug or armature 157 is pulled into the corresponding solenoid and the lever tilted in the appropriate direction. A holding coil 158 is centered between two magnetic discs 159 carried by another rod linked to the lever, so arranged that when the coil is energized (which is always the case except when the magnetic clearance button 146 is pressed to open the circuit momentarily) it will not pull either disc toward it, but will hold either disc which is moved against the coil or its core structure by action of coils 155 or 156, or handle 148. Thus, when a flavor selection has been made, or the idling control operated, the condition of all the selecting switches 138 will be kept in their selected condition until button 146 is pressed, when all selecting switches will return to their neutral or centered positions, the position shown in Fig. 13.

Reference has been made above to an "idling" condition of the machine, and to an idling switch 144. As best shown in Fig. 14, this switch is of the double-button rocker type, with a pair of buttons 166 and 168, of which button 168 when depressed, breaks a contact between terminals 170 and momentarily makes contact 176 which energizes magnet coils 156 (Fig. 13) to put switch 138 in its up, or idling, condition. Switch 144 remains in its neutral position while the machine is idling, due to the centering springs 178 and 180, and hence the circuit to the liquid and air valves 72 of Fig. 6 is open at contacts 170 to prevent over-charging of the secondary compartments or cylinders 12.

Operation of push button switch 198 (Fig. 2) energizes all of the magnets 155 of switches 138 to permit dispensing of all of the flavors at once without requiring operation of all seven of the individual flavor-selecting buttons. The contact at terminals of switch 198 need be only momentary, since the holding magnet 158 is always energized except when the clearance switch 146 is momentarily operated.

Reference has also been made above to a toggle-switch operating device 36 mounted on the shaft of each impeller, as in Fig. 1 of the drawings. The arrangement of this switching control is detailed in Fig. 15, which shows one shaft 24 carrying the operating disc 182 fixed thereon and disposed to engage a pair of toggle switches 184, 186 near respective ends of travel of the shaft 24. Near the forward end of each shaft stroke, switch 184 opens and de-energizes a circuit to close the corresponding pneumatic control valve 32 for the corresponding pneumatic cylinder or actuator 30, so that the reaction of the helical impeller against the cylinder contents, when congealed will return the shaft to its rear position at a speed determined by the size of a bleeder orifice in said control valve. Since switch 184 is opened prior to actual arrival of the impeller at its forward-most position, the pneumatic actuator will be cut off, and the impeller returned, unless the presence of a considerable amount of congealed material remaining in the cylinder may prevent full forward strokes. Also, after a serving has been made, opening of master switch 142 (or foot switch 200) cuts off the current to actuator valves 32, and the impellers are returned by reaction against the cylinder contents as described. Near the end of the forward stroke, switch 186 is closed to energize the solenoid 72 to open the valve (Fig. 6) to admit aerated mixture into the cylinder. This admission phase continues through a portion of the return movement of the shaft, the portion being predetermined by adjustment of an abutment screw or the like 187 in Fig. 15.

With the construction of the various switches and their controls in mind, the complete operation of the machine will best be followed by referring to the schematic diagram, Fig. 16 of the drawings. A main switch 194 (see also Figs. 1 and 2) connects the entire device to the power line, and controls the motor or motors, for gear driving power, air compression and refrigeration and the agitating motors 18. The main switch may also include an overload cutout, and also controls the primary circuit of a step-down transformer 196 which supplies low-voltage to the operating and holding magnets of the flavor-selecting switches 138. The master switch 142 controls the application of power to all other parts of the device except the transformer and the coils of switches 138. When the main switch is closed, it applies power through transformer 196 to the "holding" coils 158 of switches 138, so that any switches 138 which have had their handles depressed will remain in that condition until the circuit is momentarily broken through the holding coils by clearance switch 146, which is a normally-closed push button switch.

In order to simplify Fig. 16, duplicate wiring pertaining to different selecting switches and their coils has been omitted. Thus, while the wiring from transformer 196 through clearance switch 146 is shown leading to the holding coil 158 of the first switch 138, it is to be understood that all of the holding coils of the other switches are connected in parallel to that of the first switch, so that all switches 138 are released to their neutral positions simultaneously. Likewise, the coils 155 and 156 of all switches 138 are connected in parallel. The contacts are opened and closed when the handles of the switches are depressed, are connected to the respective air inlet valves 32, mixture inlet valves 72 and gate valves 122, in a manner quite apparent from Fig. 16.

In first starting up the machine after it has been idle and cleaned, the main switch and master switch 142 are closed, but the air supply to the pneumatic actuators is kept off until refrigerating temperatures have been reached; then air pressure is supplied, bringing all of the impellers (which are now rotated through the gearing of Fig. 4) forward, and switch 184 of each operates to cut off the air supply of each (at solenoid valves 32) as it arrives near the front end of the secondary chamber. Each impeller, when its air pressure is cut off, is impelled to return at a predetermined rate because of the reaction of congealed material which has been admitted by solenoid injector valves 72, the rate of return being governed by a bleeder orifice in the actuators, as stated above.

At the time each impeller starts its return (rearward) stroke, switch 184 is open, and not only interrupts the air supply to actuator 30, but also interrupts the circuit of solenoid gate valve 122, to prevent any back flow of material in the discharge conduits, which back flow might occur if one or more of the selector switches 138 had been actuated. If there is sufficient congealed material in a chamber, its impeller will be unable to move all the way forward, and thus switch 186 (which closes only on a full forward motion) will prevent the admission of more material via the solenoid valves 72, and prevent overcharging of the chambers 12. Thus, the impellers will reciprocate as long as the master switch 142 is closed. A foot pedal switch 200 (Fig. 2) is preferably connected in parallel with switch 142, to permit the impellers to reciprocate under foot control when desired, to leave the operator's hands free.

With the master switch 142 (or foot pedal switch 200) closed, button 168 of switch 144 is depressed momentarily to put the machine in idling condition, with all magnets 156 energized and contacts 154 closed, and thus with the impellers being reciprocated by the air valves 32 and switches 184, which also close the gate valve solenoids 122 at the discharge end during reverse movement of the impellers as already explained. To serve a selected combination of flavors, the appropriate handles 148 of switches 138 are depressed, closing contacts 153 so that the corresponding solenoids 122 for the outlet gate valves are opened during forward movement of the impellers, closing contacts 152 and allowing solenoid mixture-inlet valves 72 to be re-energized during the return stroke to replenish any material withdrawn from the chambers 12. The actual dispensing of the chosen flavor combination is manually controlled by the handle valve 114 of Figs. 1 and 2.

After each serving, or whenever a new combination is to be selected, the clearance switch 146 is depressed momentarily, to interrupt the holding coils 158 and restore all switches 138 to neutral positions. In the event that all of the flavors are to be dispensed at once, the button 198 is depressed momentarily, which energizes all of the coils 155, and pulls down all of the toggle handles of the selecting switches, where they are held by the holding magnet coil circuit, until again cleared by depressing clearance switch 146. The button 166 may be employed to cause feeding of mixes into all of the chambers in the event of a storage of congealed materials therein, but this should only be done for a short period or over-filling would result.

It has been stated that the liquid mixture drawn from the pre-cooling chambers 14 is injected into the cylinders 12, through the valve arrangement of Fig. 6, by means of a jet of compressed air. While air under pressure is convenient for this purpose, it is within the scope of the invention to substitute other gases, for example such gases as are known to impart additional flavor qualities to edible materials such as whipped cream. If used, these special gases may be connected to the injector valves by tubes or the like leading to the usual pressure vessels in which gases are sold.

The mechanical arrangement of the entire apparatus, as described above, is such that ready access is provided to the mixing and cooling cylinders, as well as to the discharge manifold, to facilitate cleaning. In order to make it practical to sterilize all of the parts which come in contact with the material being dispensed, the attachment illustrated in Fig. 17 is provided. Briefly, the use of this attachment enables the apparatus, when emptied of its contents, to be used for circulating a sterilizing fluid from the precooling compartments 14 through the inlet injector valves (Fig. 6), the cylinders 12 and back to the precooling chambers.

Briefly, the attachment comprises a pair of multiple hose connectors which can be applied to the rear header plate (Fig. 5) and defining a conduit from each of the vent openings 66 of each cylinder to a respective one of the precooling compartments 14. In Fig. 17, these tubular connectors are shown in place, and it will be seen that each of the hoses 202 terminates at its upper end in a rigid hook-like outlet tube 204 which can be hung upon the wall of the appropriate compartment 14 when the access door (Fig. 1) is open. At its lower end, each hose 202 terminates in a right-angle fitting 206 adapted to be sealed in one of the vent openings 66 of Fig. 5 as by a quick-detachable nut 208. This nut may be provided with lugs to engage corresponding lugs located at the vent apertures 66.

With all of the flexible conduits 202 connected as shown, the precooling chambers 14 may be filled with a suitable sterilizing liquid, and the machine put into operation. The impellers will reciprocate in the usual way, and the combined liquid and air injector valves will permit the sterilizing fluid to enter cylinders 12 via the injector valves and be swirled about in the cylinders. When a sufficient amount of this liquid has been admitted to each of the cylinders, it will be discharged through the vent openings 66 and thence returned through hoses 202 to the compartments 14.

After a sufficient length of time, the liquid may be withdrawn through valve 114 at the front of the machine (the "serve-all" button 198 being operated) and disposed of. Water may then be circulated in the machine in the same manner, leaving all of the parts which are contacted by the edible mixture, during normal use, in completely sterilized condition.

It will be seen from the above description that the invention provides an efficient device for selective preparation and dispensing of a variety of congelated materials, and in general satisfied the objects set forth in the objects of the invention at the beginning of the description. However, it is to be understood that the details of the combined machine may be altered in various ways without departing from the spirit of the invention, and I intend to cover herein all such changes and modifications as fall within the scope of the appended claims.

I claim:

1. Apparatus for preparing and dispensing selected combinations of congelated creams or the like, comprising a housing, a plurality of individual congealing cylinders disposed in a parallel arrangement within said housing and extending substantially from end to end thereof, a plurality of pre-cooling reservoirs for liquid mixes to be congealed in said cylinders, conduits connecting said respective reservoirs with said respective cylinders, a valve and a pneumatic injector in each of said conduits, a combined rotary and reciprocable agitator and impeller disposed in each of said cylinders, power means for reciprocating said impellers, a pressure relief device on the outlet end of each of said impellers, an outlet manifold having passages connecting said respective cylinders to a common discharge throttle, individual selecting valves controlling said passages, said throttle providing a plurality of separate passages from said cylinders to a discharge orifice, a plurality of individual switches each operable to prepare a circuit for the corresponding selecting valve to open the same only during movement of the corresponding impeller toward the manifold and to prepare a circuit for the corresponding injector to open the same only during movement of the corresponding impeller away from the manifold, and switch means operable by each impeller for completing the prepared circuits in timed relation to the movements of said impeller.

2. Apparatus in accordance with claim 1, including power means for continuously rotating all of said impellers.

3. Apparatus for continuously congelating a plurality of different mixtures and for selectively dispensing the same, comprising a plurality of mixture reservoirs, a corresponding plurality of congealing chambers, means for controlling the admission of mixture to each of said chambers, means for withdrawing congealed mixtures from selected ones of said chambers, and means responsive to the depletion of congelated material in the selected chambers for selectively admitting the corresponding uncongealed mixtures from said reservoirs to the corresponding chambers.

4. Apparatus in accordance with claim 3, including a reciprocable combined mixing and conveying device in each chamber, and pressure-relief means on each such device for venting congealed mixture backwards within said chamber relative to said conveying device upon a predetermined pressure increase.

5. Apparatus in accordance with claim 4, in which said device comprises a shaft and a helical blade on said shaft dimensioned for loosely fitting said chamber.

6. Apparatus in accordance with claim 4, in which said device comprises a multi-turn helical blade having a pitch, at its central portion, substantially greater than at its end portions.

7. Apparatus in accordance with claim 6, in which said blade has apertures therein in a region adjacent the entrance end of said chamber.

8. In congelation apparatus for preparing and simultaneously dispensing a selected combination of different preparations, means for continuously congealing a plurality of different mixes, means for selectively withdrawing portions of selected ones of said mixes from said congealing means, a dispensing manifold having multiple ducts arranged to convey the selected portions separately to a common outlet, and a partitioned nozzle at said outlet for conveying the withdrawn portions and directing them into intimate contact with one another so as to issue as a single shaped stream in which each selected mix retains its individual character and composition.

9. Apparatus for preparing and dispensing congelated mixtures, comprising a refrigerated congelating chamber, a helical impeller mounted in said chamber for lateral motion thereof, power means for continuously rotating said impeller, other power means for reciprocating said impeller to agitate the chamber contents and propel it in one direction through said chamber, and means for admitting uncongelated mixture to said chamber in timed relation to the reciprocation of said impeller.

10. Apparatus in accordance with claim 9, and control means for operating said admitting means from time to time in response to a reduction in the quantity of congelated mixture in said chamber.

11. Apparatus for preparing and dispensing a congelated confectionery product in the form of a composite stream formed of contiguous shaped longitudinal portions of different compositions, comprising a plurality of chambers adapted to contain congelated mixtures of various compositions, power means for dispensing a mixture from each chamber, selective valves for controlling the discharge of mixture from respective chambers, a manifold comprising plural independent mixture ducts leading from said respective valves, and arranged to bring together in parallel relation the streams of mixtures issuing from the chambers, and a common outlet nozzle connected to said manifold to dispense the combined product in a single stream, said nozzle having thin radial partitions defining spaces individually communicating with the respective plural ducts of said manifold.

12. Apparatus for preparing and dispensing congelated materials, comprising a refrigerated congelating chamber, a discharge valve for said chamber, a helical impeller mounted in said chamber, power means for continuously rotating said impeller, means for moving said impeller in one direction in said chamber to force the mixture out of said chamber through said discharge valve, said impeller moving in the opposite direction in said chamber due to the reaction thrust of the material therein when said discharge valve is closed, and means for admitting uncongelated mixture to said chamber during such opposite movement of said impeller, whereby the amount of uncongelated mixture so admitted is proportioned to the cumulated amount of congelated mixture theretofore discharged.

References Cited in the file of this patent

UNITED STATES PATENTS

| | | |
|---|---|---|
| 915,469 | Destriecher | Mar. 16, 1909 |
| 1,205,494 | Watts | Nov. 21, 1916 |
| 1,514,985 | Myers | Nov. 11, 1924 |
| 1,756,261 | Pfouts | Apr. 29, 1930 |
| 1,873,596 | Jones | Aug. 23, 1932 |
| 2,020,878 | Doering | Nov. 12, 1935 |
| 2,025,757 | Lindsey | Dec. 31, 1935 |
| 2,191,344 | Erickson | Feb. 20, 1940 |
| 2,226,979 | Rahauser | Dec. 31, 1940 |
| 2,415,585 | Genova | Feb. 11, 1947 |
| 2,491,852 | Carvel | Dec. 20, 1949 |
| 2,493,395 | Elwell | Jan. 3, 1950 |
| 2,559,032 | Tachella | July 3, 1951 |
| 2,564,392 | Burrucker | Aug. 14, 1951 |
| 2,574,818 | Edmonds | Nov. 13, 1951 |
| 2,608,833 | Woodruff | Sept. 2, 1952 |
| 2,651,343 | Alexander | Sept. 8, 1953 |
| 2,687,019 | Swenson | Aug. 24, 1954 |

FOREIGN PATENTS

| | | |
|---|---|---|
| 183,976 | Germany | July 14, 1905 |